US00RE34711E

United States Patent [19]

Compagnon

[11] E Patent Number: Re. 34,711

[45] Reissued Date of Patent: Aug. 30, 1994

[54] DEVICE FOR FEEDING AN EXTRUSION HEAD FOR PLASTIC MATERIAL

[75] Inventor: Michel F. Compagnon, La Tour-de-Peilz, Switzerland

[73] Assignee: Nokia-Maillefer SA, Ecublens, Switzerland

[21] Appl. No.: 699,447

[22] PCT Filed: Mar. 5, 1987

[86] PCT No.: PCT/CH87/00026

§ 371 Date: Oct. 27, 1987

§ 102(e) Date: Oct. 27, 1987

[87] PCT Pub. No.: WO87/05258

PCT Pub. Date: Sep. 11, 1987

Related U.S. Patent Documents

Reissue of:

[64] Patent No.: 4,832,960
Issued: May 23, 1989
Appl. No.: 124,994
Filed: Mar. 5, 1987

[30] Foreign Application Priority Data

Mar. 6, 1986 [CH] Switzerland ..... 928/86

[51] Int. Cl.[5] ..... B29C 47/04; B29C 47/10

[52] U.S. Cl. ..... 425/131.1; 264/211.23; 425/132; 425/133.1; 425/204; 425/376.1; 425/462; 425/465

[58] Field of Search ..... 425/131.1, 132, 133.1, 425/133.5, 145, 376.1, 465, 463, 204, 208, 462; 264/167, 176.1, 177.1, 211.21, 211.23

[56] References Cited

U.S. PATENT DOCUMENTS

| | | | |
|---|---|---|---|
| 2,261,977 | 11/1941 | Deutsch | 425/131.1 X |
| 2,456,141 | 12/1948 | Myerson | 425/133.1 |
| 2,808,617 | 10/1957 | Terracini et al. | 425/462 |
| 3,143,583 | 8/1964 | Haugwitz | 264/171 |
| 3,256,562 | 6/1966 | Heard, Jr. | 425/132 X |
| 3,504,402 | 4/1970 | Wetz et al. | 425/131.1 |
| 3,733,156 | 5/1973 | Garner | 425/132 |
| 3,743,460 | 7/1973 | Woolridge | 425/133.5 |
| 3,752,617 | 8/1973 | Burlis et al. | 425/145 X |
| 3,801,249 | 4/1974 | Milani | 425/463 X |
| 3,820,927 | 6/1974 | Toomajanian | 425/113 |
| 3,901,958 | 8/1975 | Doll | 425/133.1 X |
| 3,924,990 | 12/1975 | Schrenk | 425/131.1 |
| 4,028,024 | 6/1977 | Moreland | 425/133.1 |
| 4,128,386 | 12/1978 | Wissinger et al. | 425/462 |
| 4,152,387 | 5/1979 | Cloeren | 264/171 |
| 4,197,069 | 4/1980 | Cloeren | 425/131.1 |
| 4,276,250 | 6/1981 | Satchell et al. | 264/167 |
| 4,280,801 | 7/1981 | Wheeler, Jr. et al. | 425/113 |
| 4,405,547 | 9/1983 | Koch et al. | 425/133.5 X |
| 4,533,308 | 8/1985 | Cloeren | 425/131.1 |
| 4,600,550 | 7/1986 | Cloren | 264/171 |
| 4,761,129 | 8/1988 | Aste et al. | 425/133.1 |
| 4,784,815 | 11/1988 | Cloeren et al. | 264/171 |

FOREIGN PATENT DOCUMENTS

| | | |
|---|---|---|
| 0245314 | 3/1989 | European Pat. Off. . |
| 1080646 | 12/1957 | Fed. Rep. of Germany . |
| 1933570 | 1/1971 | Fed. Rep. of Germany . |
| 2921943 | 12/1980 | Fed. Rep. of Germany . |
| 1277313 | 10/1961 | France . |
| 2400424 | 3/1979 | France . |
| 28707 | 12/1947 | Luxembourg . |

OTHER PUBLICATIONS

Davis-Standard Division, blue print of extruder bleed valve, 1984.

Cloeren, Advertisement of 1988, The Cloeren Company.

Unitek, Unitek Colour Changing System-UCCS, pp. 533-534, Aug., 1988.

*Primary Examiner*—Richard L. Chiesa
*Attorney, Agent, or Firm*—Oliff & Berridge

[57] ABSTRACT

A device for feeding an extrusion head for plastic material includes a main extruder connected to a main die for extruding a continuous main flow of material, and an auxiliary feed mechanism associated with the main die and selectively controlled to cover the outer exit flow of the main die with a surface layer. The auxiliary feed mechanism continuously conducts two auxiliary flows, a first flow forming the surface layer and the second flow being mixed with the main flow. An invertor valve permits selective exchanging of the two auxiliary flows such that the second flow can cover the main flow and the first flow can be mixed with the main flow.

26 Claims, 3 Drawing Sheets

DEVICE FOR FEEDING AN EXTRUSION HEAD FOR PLASTIC MATERIAL

Matter enclosed in heavy brackets [ ] appears in the original patent but forms no part of this reissue specification; matter printed in italics indicates the additions made by reissue.

BACKGROUND AND SUMMARY OF THE INVENTION

The subject of the present invention is a device for feeding an extrusion head for plastic material.

Devices of this kind, already known, are used especially for fabricating by extrusion elongated products of plastic material presenting a colored surface layer.

It is usual to use two method for that:

1. Master-batches of colors are added to the mass of plastic material,

2. An additional extruder is used, which deposits a colored surface skin around the extruded shape.

The second method has the advantage of saving on the coloring agents since only a thin layer of the extruded product is colored.

The object of the present invention is to improve the feed devices already known, in order to apply the second method described above by achieving an instantaneous change of color without waste of material.

To this end, the device according to the invention is characterized in that is comprises a main extruder connected to a main die and a feed means associated with the main die and capable of being selectively controlled so as to cover the exit flow of the main die with a surface layer formed of successive segments, the appearance of which differs.

BRIEF DESCRIPTION OF THE DRAWINGS

An embodiment of the subject of the invention will be described below, by way of example, referring to the appended drawing, in which.

DETAILED DESCRIPTION OF THE PREFERRED EMBODIMENT

Figure 1:
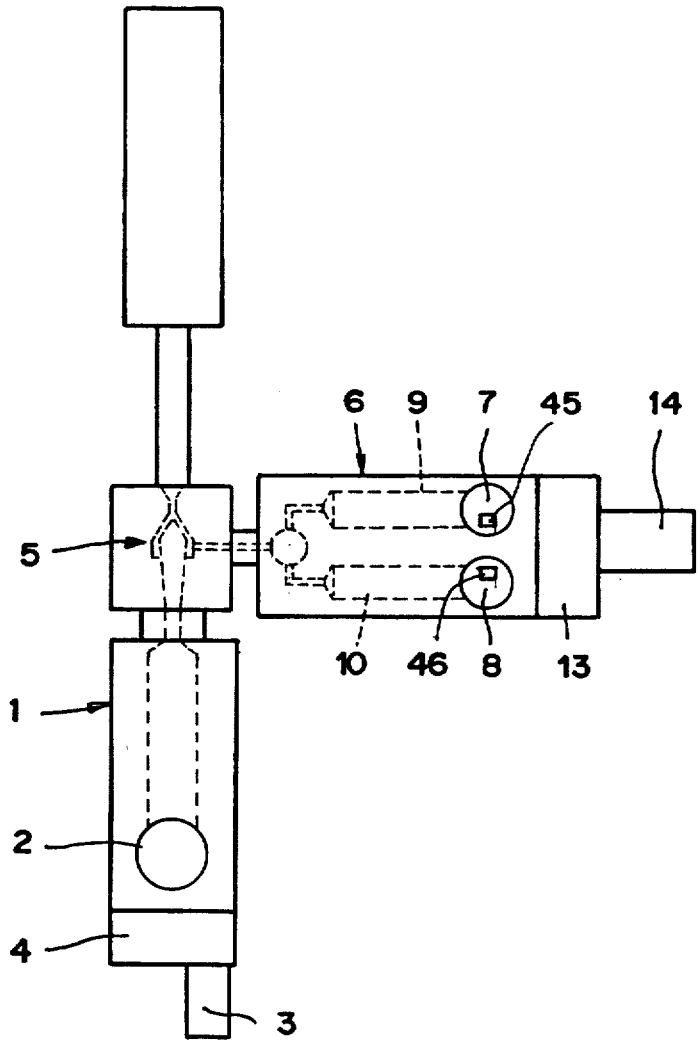
FIG. 1 is a schematic top plan view showing an extrusion installation equipped with the device according to the invention.
Figure 2:
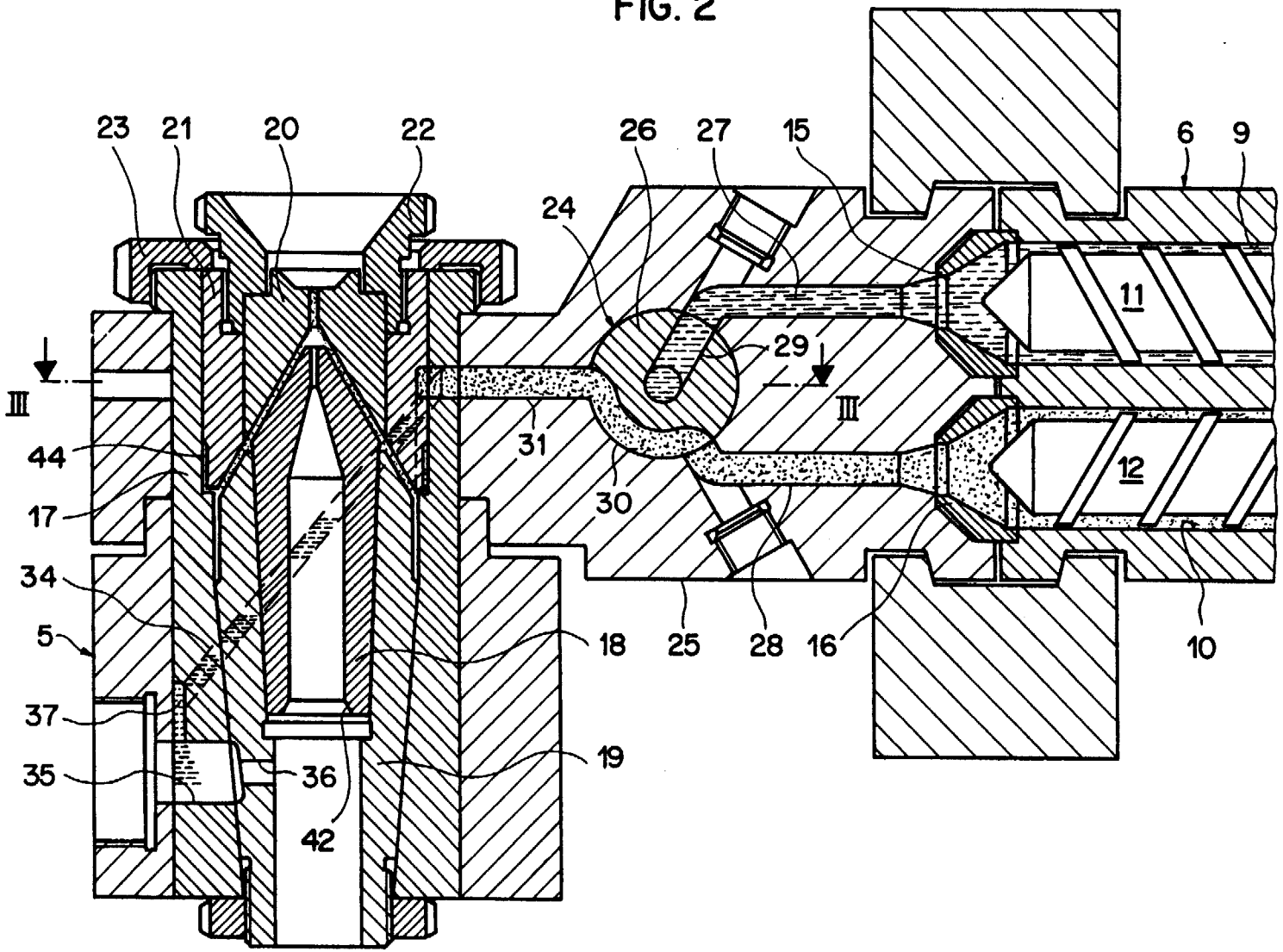
FIG. 2 is a sectional view on a horizontal plane showing on a larger scale the extrusion head and its different feed orifices.

The installation depicted in FIG. 1 is intended for the continuous production of a section of plastic material, for example, a bar, or a tube, the cross-section of which may have any shape. It comprises a main extruder 1 provided with a feed hopper 2 and driven by a motor 3 having a reduction gear 4. Mounted at the end of the cylinder of this extruder 1 is an extrusion head 5, the details of which are visible in FIG. 2. On the other hand, this extrusion head 5 is connected to an auxiliary twinscrew [extruded] *extruder* 6 provided at its rearward end with two feed hoppers 7 and 8. As is seen in FIG. 2, the auxiliary extruder 6 comprises two parallel cylindrical bores 9 and 10, in each of which a screw 11 or 12 rotates. These screws are driven by a single speed-reduction gear 13 from a single motor 14, ensuring that the two screws constantly rotate at the same speed. As the dimensions of the screws are the same, the flows of plastic material formed in the two cylinders 9 and 10 are of the same rate and reach the exit orifices 15 and 16 of the extruder 6 in the same state of fluidity and compression.

FIG. 2 further shows the structure of the extrusion head 5. Mounted in the cylindrical die body 17 are a main die 18, supported by a die holder 19 and, in front of the die body 17, an auxiliary die 20 supported by a die holder 21 and fixed by a nut 22, the die holder being itself secured to the body 17 by a nut 23. The die 18 is fed at the rear of the extrusion head through the die holder 19 in a conventional manner. Thus, a direct connection of the die holder to the outlet of the cylinder of the extruder 1 is provided for.

Figure 3:
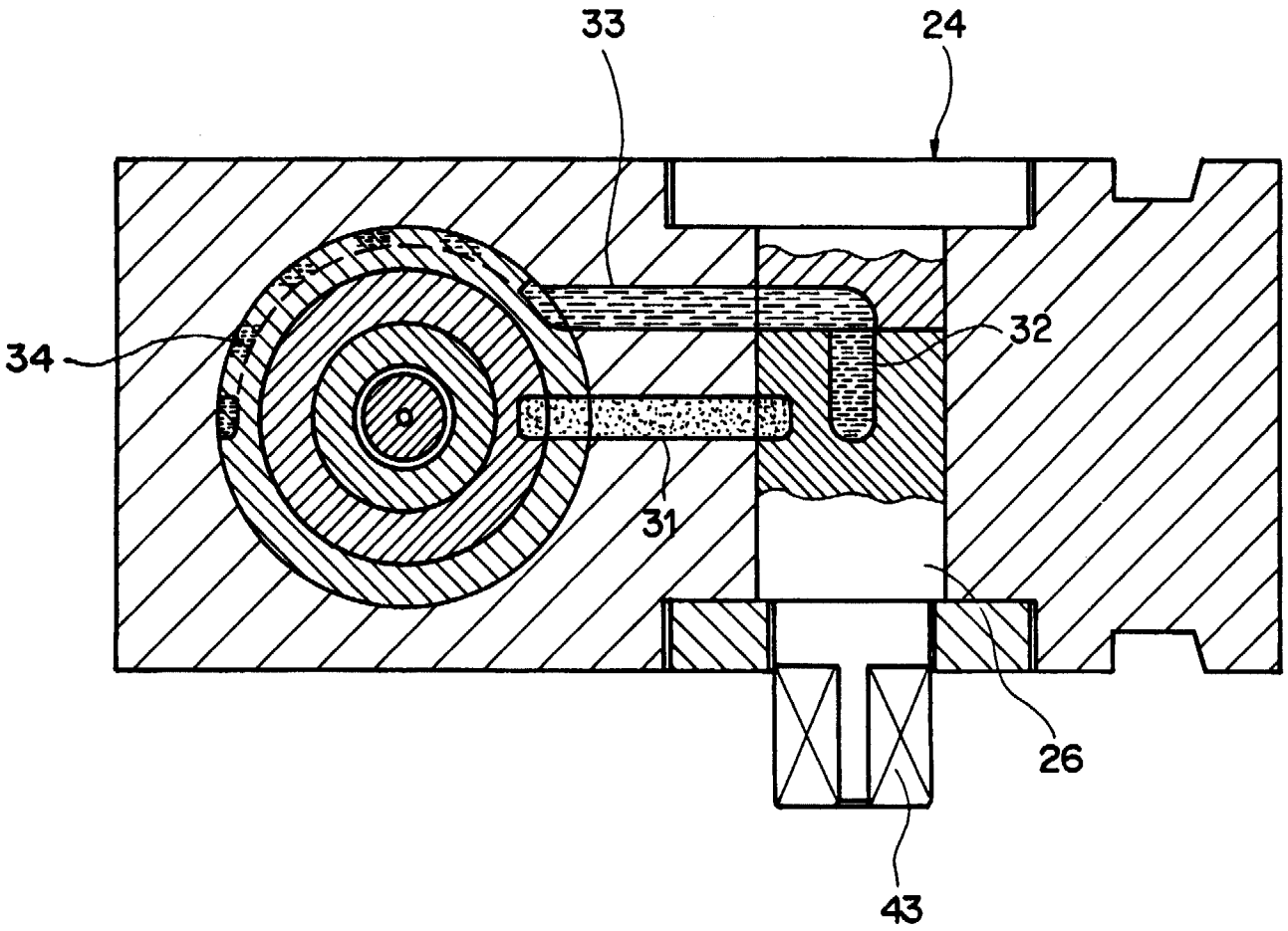
FIG. 3 is a sectional view along the line III—III of FIG. 2.

The auxiliary extruder 6 is connected to the extrusion head 5 by ducts which form two paths, these pass through a multiple-way valve 24, the body 25 of which is fixed to the end of the body of the extruder 6 in such a way as to be able to feed the head 5 laterally. The multiple-way valve 24 comprises a cylindrical valve needle 26. At one end, this valve needle is provided with a prolongation of square cross-section (FIG. 3) permitting it to be rotated about its axis through an angle of 120° in order to effect the conversion of the colors, as will be seen below. One of the two inlets 27 and 28 made in the body 25 ends facing a radial bore 29 passing through the valve needle 26 up to its axis, and the other facing a groove 30 which extends over 120° along the circumference of the valve needle 26. In the position depicted in FIG. 2, the groove 30 causes the inlet 28 to communicate with an outlet 31 which ends, through the die body 17, in the outside surface of the die holder 21 and thence, via a distribution duct 44, feeds the conical space comprised between the dies 20 and 18. By this route, the plastic material forced back by the screw 12 forms a tubular film on the surface of the elongated product which is shaped in the die 18 with the material supplied by the main extruder. While the valve 24 is in the position of FIG. 2, the material forced back by the screw 11 passes through the orifice 15 and into the duct 27. It arrives, as is seen in FIG. 3, through an axial duct 32 of the valve needle 26, in an outlet duct 33 which is connected to a helical channel 34 made in the body 17 in such a way as to encircle the die 18 and, via the groove 37, the receptacle 35, and a radial duct 36, to arrive in the inlet orifice 42 of the main die 18. This material is therefore mixed with the material supplied by the main extruder, and as a result of its being projected in the form of a jet into the receptacle 35 from the groove 37, a rather rapid mixture of these two materials takes place.

It will be realized that the functions of the two auxiliary extruder screws 11 and 12 may be reversed by rotating the valve needle 26 about its axis clockwise, as viewed in FIG. 2 through an angle of 120°. In this case, the inlet duct 27 is then connected directly to the outlet duct 31, while the inlet duct 28 is connected via the radial bore 29 and the axial channel 32 to the duct 33, to the helical channel 34, and to the groove 37.

Figure 4:
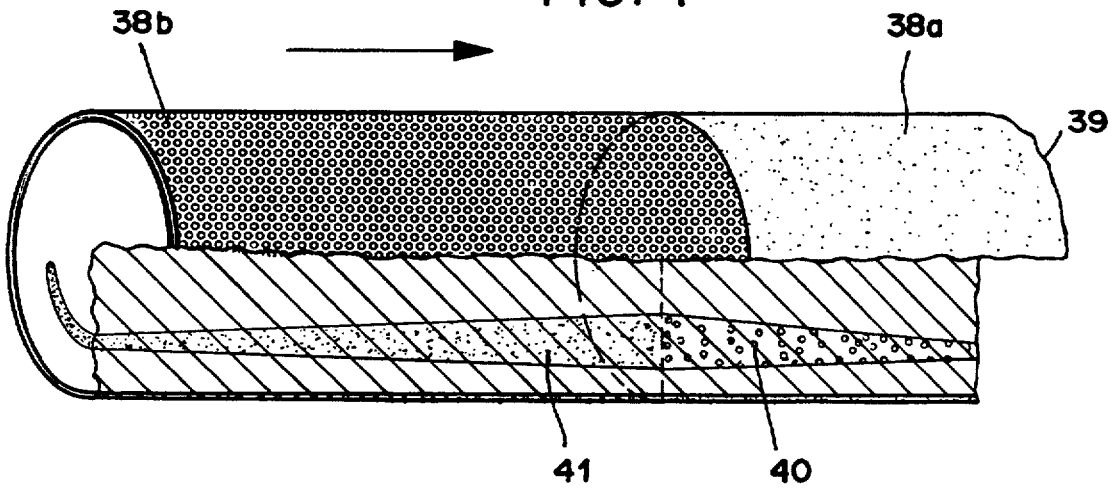
FIG. 4 is a perspective view, partially cut away, of a length of a section of plastic material fabricated by the device of FIGS. 1 to 3.

The use of the device described and the advantage of this device follows from FIG. 4, which depicts in cutaway perspective a length of section, for example, a cylindrical rod of plastic material, fabricated with the device described. It will be understood that each of the hoppers 7 and 8 of the auxiliary extruder 6 is provided with a volumetric metering apparatus 45, 46, permitting a certain quantity of coloring agent to be inserted in this hopper, with the plastic material which feeds it, the two colorant distributors containing materials of different colors, for example, red and blue. It is therefore seen that if the valve needle 26 is in the position of FIG. 2, and if the cylinder 10 is fed by a plastic material provided with a batch of red colorant, the front portion [3a] *38a* of the cylindrical section produced by the installation will be provided with a red surface film 39. However, the installation will permit changing the coloring of the surface film 39 in the following segment 38b by a simple manipulation of the valve 24. It will be necessary beforehand to start up the colorant-metering apparatus 45 of the cylinder 9 in order that the hitherto virgin plastic material which is led into the receptacle 35 via the ducts 29, 32, and 33 starts to be colored blue, as depicted at 40 in FIG. 4. At the moment when the desired red length of the elongated section has been produced, it will suffice to switch over the valve 24. Immediately, the blue material supplied in the inlet duct 27 will be directed toward the auxiliary die 20 and will give the surface film 39 a blue coloring, which will appear on the section, forming the segment 39b. The mass of red plastic material which the screw 12 forces into the duct 28 will then be led via the by-pass 34 into the receptacle 35 and will form a colored zone 41 in the thickness of the section. After the reversal of the colors, the introduction of the coloring agent into the hopper 8 by the metering apparatus 46 can be stopped, so that the cylinder 10 will then carry virgin plastic material, similar to that which enters the die 18 through the orifice 42 from the main extruder 1.

The system described lends itself to the production of any section of plastic material produced continuously. It applies, for example, to the production of tubes, but equally to the production of insulating layers covering an electric conductor, to the production of sheaths on cables, etc. The device permits, for example, producing a certain length X km of elongated section covered with a surface layer of one color during a given time, changing the visible color instantly, and producing a length Y km of the same product covered with a surface layer of another color. The extruder continuously works virgin material. One of the two cylinders of the auxiliary extruder continuously works on the virgin material, the other on the colored material. The passing from one color to the other is achieved by starting up the metering apparatus containing the coloring agent having the required color, then, at the required moment, by manipulating the valve 24.

The starting up of the volumetric metering apparatus can be achieved automatically by electronic means, such as a preset counter. Of course, the colors may be alternated, or sections successively having lengths of several different colors may be produced.

What is claimed is:

1. A device for forming a continuous elongated element of plastic material through extrusion, comprising:

a main extruder for a continuous main flow of a first plastic material;

auxiliary feed means comprising two auxiliary flow exit orifices for continuously conducting auxiliary flows of a second and third plastic material, respectively, all of said first, second and third plastic materials forming said main and auxiliary flows having different constitutions;

a composite extrusion head having a die system, two auxiliary flow inlet orifices, a main flow inlet orifice, a mixing receptacle adjacent said main flow inlet orifice, an outlet orifice defined by an outlet die of said die system, and ducts within said composite extrusion head connecting each of said auxiliary flow inlet orifices to said outlet orifice through different routes, one of said routes connecting one of said auxiliary flow inlet orifices to said mixing receptacle through a helical channel in an outer peripheral portion of said composite extrusion head, the other one of said routes connecting the other one of said auxiliary flow inlet orifices with said outlet orifice through said die system to provide in said elongated element a continuous zone having in said element a predetermined location; and inverter means connected to said exit orifices of said auxiliary feed means and said auxiliary flow inlet orifices of said composite extrusion head for exchanging the connections between said auxiliary flows exit and inlet orifices.

2. The device according to claim 1 [in which] *wherein* one of the auxiliary flow inlet orifices of the composite extrusion head is connected to ducts forming an outer layer on the elongated element, and the other auxiliary-flow inlet orifice of the extrusion head is connected to means for mixing the auxiliary flow led through said other auxiliary flow inlet orifice with the main flow.

3. The device according to claim 2, [characterized in that] *wherein* the extrusion head comprises a mixing cavity connected to a main inlet of the extrusion head connected in turn to the main extruder and to the other auxiliary-flow inlet orifice.

4. The device according to claim 1, [characterized in that] *wherein* the auxiliary feed means comprise an auxiliary extruder having two screws housed in two cylinders contained in a single body.

5. The device according to claim 4, [characterized in that] *wherein* the two screws of the auxiliary extruder are driven by a single motor through the intermediary of a single speed-reduction gear.

6. The device according to claim 4, [characterized in that] *wherein* the two cylinders of the auxiliary extruder are each connected to a hopper for introducing plastic material, and in that each of [these] *said* hoppers is provided with a colorant-metering apparatus.

7. The device according to claim 1, [characterized in that] *wherein* the inverter means comprises a valve having two inlet ways and two outlet ways, and a valve needle rotatable between two active positions.

8. The device according to claim 7, [characterized in that] *wherein* the valve needle is of cylindrical shape and has an axial passage connected to a radial inlet way and a radial outlet way, and an arcuate circumferential passage situated in a plane perpendicular to the axis of the valve needle, at the level of the radial inlet way, the radial inlet way and the ends of the circumferential passage defining three segments of a circle of 120° each on the circumference of the valve needle.

9. A device for continuous extrusion of an elongated element of plastic material comprising a composite extrusion head, a main extruder producing a main flow, auxiliary feed means including two exit orifices conducting two auxiliary flows, and control means permitting the extrusion head to be fed selectively so that one or the other of the said auxiliary flows forms a particular zone in the elongated element, the composite extrusion head further comprising two auxiliary-flow inlet orifices and a main-flow inlet orifice, respectively connected to the exit orifices and to the main extruder, and the control means comprising an inverter capable of exchanging the connections between the exit orifices of the auxiliary feed means and the said auxiliary-flow inlet orifices; wherein one of the auxiliary-flow inlet orifices of the extrusion head is connected to ducts forming an outer layer on the elongated element, the other auxiliary-flow inlet orifice of the extrusion head is connected to means for mixing the auxiliary flow led through this orifice with the main flow;

the extrusion head comprises a mixing cavity connected, on the one hand, to a main inlet of the extrusion head connected in turn to the main extruder and, on the other hand, to the said other auxiliary-flow inlet orifice; and the inverter comprises a valve having two inlet ways and two outlet ways, and a cylindrical shape valve needle rotatable between two active positions, the valve needle having an axial passage connected to a radial inlet way and a radial outlet way, and an arcuate circumferential passage situated in a plane perpendicular to the axis of the valve needle, at the level of the said radial inlet way, the radial inlet way and the ends of the circumferential passage defining three segments of a circle of 120° each on the circumference of the valve needle.

10. The device according to claim 9, [characterized in that] *wherein* the auxiliary feed means comprise an auxiliary extruder having two screws housed in two cylinders contained in a single body.

11. The device according to claim 10, [characterized in that] *wherein* the two screws of the auxiliary extruder are driven by a single motor through the intermediary of a single [speedreduction grear] *speed reduction gear.*

12. The device according to claim 10, [characterized in that] *wherein* the two cylinders of the auxiliary extruder are each connected to a hopper for introducing plastic material, and in that each of [these] *said* hoppers is provided with a [colorantmetering] *colorant metering* apparatus.

*13. A device for forming a continuous elongated element of plastic material through extrusion, comprising:*

*a main extruder for a continuous main flow of a first plastic material;*

*auxiliary feed means comprising two auxiliary flow exit orifices for continuously conducting auxiliary flows of a second and third plastic material, respectively, all of said first, second and third plastic materials forming said main and auxiliary flows having different constitutions;*

*a composite extrusion head having a die system, two auxiliary flow inlet orifices, a main flow inlet orifice, an outlet orifice defined by said die system, and ducts within said composite extrusion head connecting each of said auxiliary flow inlet orifices to said outlet orifice through different routes, one of said routes connecting one of said auxiliary flow inlet orifices to a channel in said composite extrusion head communicating with said main flow inlet orifice, the other one of said routes connecting the other one of said auxiliary flow inlet orifices with said outlet orifice through said die system to provide said elongated element with a continuous zone having a predetermined location; and*

*inverter means connected to said exit orifices of said auxiliary feed means and said auxiliary flow inlet orifices of said composite extrusion head for exchanging the connections between said auxiliary flows exit and inlet orifices.*

*14. The device according to claim 13, in which one of the auxiliary flow inlet orifices of the composite extrusion head connects to ducts forming an outer layer on the elongated element, and the other auxiliary flow inlet orifice of the extrusion head connects the auxiliary flow led through said other auxiliary flow inlet orifice with the main flow.*

*15. The device according to claim 13, wherein the inverter means comprises a valve having two inlet ways and two outlet ways, and is rotatable between two active positions.*

*16. The device according to claim 15, wherein the valve includes a valve needle of cylindrical shape and has an axial passage connected to a radial inlet way and a radial outlet way, and an arcuate circumferential passage situated in a plane perpendicular to the axis of the valve needle, at the level of the radial inlet way, the radial inlet way and the ends of the circumferential passage defining three segments of a circle of 120° each on the circumference of the valve needle.*

*17. A device for continuous extrusion of an elongated element of plastic material, comprising a composite extrusion head, a main extruder producing a main flow, auxiliary feed means including two exit orifices conducting two auxiliary flows, and control means permitting the extrusion head to be fed selectively so that one or the other of said auxiliary flows forms a particular zone in the elongated element, the composite extrusion head further comprising two auxiliary flow inlet orifices and a main flow inlet orifice, respectively connected to the exit orifices and the main extruder, and the control means comprising an inverter capable of exchanging the connections between the exit orifices of the auxiliary feed means and said auxiliary flow inlet orifices; wherein*

*one of the auxiliary flow inlet orifices of the extrusion head is connected to ducts forming an outer layer on the elongated element, and the other auxiliary flow inlet orifice of the extrusion head connects the auxiliary flow led through the other auxiliary flow inlet orifice with the main flow; and*

*the inverter comprises a valve having two inlet ways and two outlet ways, and is rotatable between two active positions, said first active position directing a first flow of the auxiliary flows to the outer layer of the elongated element and a second flow of the auxiliary flows to the zone within the elongated element, and said second active position directing the first flow to the zone within the elongated element and the second flow to the outer layer.*

*18. A device for extruding a continuous elongated element of plastic materials having a core encompassed by at least one outer sheath, comprising:*

*a main extruder for extruding a continuous main flow of a plastic material;*

*first auxiliary feed means for feeding a first continuous auxiliary flow of a first material, the first auxiliary feed means having a first exit orifice for continuously conducting said first auxiliary flow;*

*second auxiliary feed means for feeding a second continuous auxiliary flow of a second material, the second auxiliary feed means having a second exit orifice for continuously conducting said second auxiliary flow;*

*extruder means for extruding the elongated element comprised of said main flow and said first and second auxiliary flows, the extruder means having a first flow path for directing one material of said first and second materials to join with the main flow to form the core of the elongated element and a second flow path for directing the other material of said first and second materials to form the outer sheath of the elongated element to encompass the core; and*

*inverter means connected to the first and second exit orifices of the first and second auxiliary feed means and the first and second flow paths of the extruder means, for selectively exchanging connections between the first and second exit orifices and the first and second flow paths.*

*19. A device for extruding a continuous elongated element of plastic materials having a core encompassed by at least one outer sheath, comprising:*

*a main extruder for extruding a continuous main flow of a plastic material;*

*first auxiliary feed means for feeding a first continuous auxiliary flow of a first material, the first auxiliary feed means having a first exit orifice for continuously conducting said first auxiliary flow;*

*second auxiliary feed means for feeding a second continuous auxiliary flow of a second material, the second auxiliary feed means having a second exit orifice for continuously conducting said second auxiliary flow;*

*extruder means for extruding the elongated element comprised of said main flow and said first and second auxiliary flows, the extruder means having a first flow path for directing one material of said first and second materials to join with the main flow to form the core of the elongated element and a second flow path for directing the outer material of said first and second materials to form the outer sheath of the elongated element to encompass the core; and*

*inverter means connected to the first and second exit orifices of the first and second auxiliary feed means and the first and second flow paths of the extruder means, for selectively exchanging connections between the first and second exit orifices and the first and second flow paths and for selectively exchanging relative positions in the elongated element of the first and second materials.*

*20. A device for extruding a continuous elongated element of plastic materials having a core encompassed by at least one outer sheath, comprising:*

*a main extruder for extruding a continuous main flow of a plastic material;*

*first auxiliary feed means for feeding a first continuous auxiliary flow of a first material, the first auxiliary feed means having a first exit orifice for continuously conducting said first auxiliary flow;*

*second auxiliary feed means for feeding a second continuous flow of a second material, the second auxiliary feed means having a second exit orifice for continuously conducting said second auxiliary flow;*

*extruder means for extruding the elongated element comprised of said main flow and said first and second auxiliary flows, the extruder means having a first flow path for directing one material of said first and second materials to join with the main flow to form the core of the elongated element and a second flow path for directing the outer material of said first and second materials to form the outer sheath of the elongated element to encompass the core;*

*inverter means connected to the first and second exit orifices of the first and second auxiliary feed means and the first and second flow paths of the extruder means, for selectively exchanging connections between the first and second exit orifices and the first and second flow paths and for selectively exchanging relative positions in the elongated element of the first and second materials without interruption of the first and second continuous flows.*

*21. A device for extruding a continuous elongated element of plastic materials having a core encompassed by at least one outer sheath, comprising:*

*a main extruder for extruding a continuous main flow of a plastic material;*

*first auxiliary feed means for feeding a first continuous auxiliary flow of a first material, the first auxiliary feed means having a first exit orifice for continuously conducting said first auxiliary flow;*

*second auxiliary feed means for feeding a second continuous auxiliary flow of a second material, the second auxiliary feed means having a second exit orifice for continuously conducting said second auxiliary flow;*

*extruder means for extruding the elongated element comprised of said main flow and said first and second auxiliary flows, the extruder means having a first flow path for directing one material of said first and second materials to join with the main flow to form the core of the elongated element and a second flow path for directing the other material of said first and second materials to form the outer sheath of the elongated element to encompass the core; and*

*inverter means connected to the first and second exit orifices of the first and second auxiliary feed means and the first and second flow paths of the extruder means, for selectively exchanging connections between the first and second exit orifices and the first and second flow paths, the inverter means being circular in cross-section and defining two conduits through the inverter means for connecting the first and second exit orifices and the first and second flow paths.*

*22. A device for extruding a continuous elongated element of plastic materials having a core encompassed by at least one outer sheath, comprising:*

*a main extruder for extruding a continuous main flow of a plastic material;*

*first auxiliary feed means for feeding a first continuous auxiliary flow of a first material, the first auxiliary feed means having a first exit orifice for continuously conducting said first auxiliary flow;*

*second auxiliary feed means for feeding a second continuous auxiliary flow of a second material, the second auxiliary feed means having a second exit orifice for continuously conducting said second auxiliary flow;*

*extruder means for extruding the elongated element comprised of said main flow and said first and second auxiliary flows, the extruder means having a first flow path for directing one material of said first and second materials to join with the main flow to form the core of the elongated element and a second flow path for directing the other material of said first and second materials to form the outer sheath of the elongated element to encompass the core; and*

*inverter means connected to the first and second exit orifices of the first and second auxiliary feed means and the first and second flow paths of the extruder means, for selectively exchanging connections between the first and second exit orifices and the first and second flow paths, the inverter means being movable*

*between first and second positions, said first position connecting the first exit orifice to the first flow path for conveying the first material to the core of the elongated element and connecting the second exit orifice to the second flow path for conveying the second material to the outer sheath of the elongated element, and said second position connecting the first exit orifice to the second flow path for conveying the first material to the outer sheath of the elongated element and connecting the second exit orifice to the first flow path for conveying the first material to the core of the elongated element.*

*23. A device for extruding a continuous elongated element of plastic materials having a core encompassed by at least one outer sheath, comprising:*

*a main extruder for extruding a continuous main flow of a plastic material;*

*first auxiliary feed means for feeding a first continuous auxiliary flow of a first material, the first auxiliary feed means having a first exit orifice for continuously conducting said first auxiliary flow;*

*second auxiliary feed means for feeding a second continuous auxiliary flow of a second material, the second auxiliary feed means having a second exit orifice for continuously conducting said second auxiliary flow;*

*extruder means for extruding the elongated element comprised of said main flow and said first and second auxiliary flows, the extruder means having a first flow path for directing one material of said first and second materials to join with the main flow to form the core of the elongated element and a second flow path for directing the other material of said first and second materials to form the outer sheath of the elongated element to encompass the core; and*

*inverter means connected to the first and second exit orifices of the first and second auxiliary feed means and the first and second flow paths of the extruder means, for selectively exchanging connections between the first and second exit orifices and the first and second flow paths, the inverter means being circular in cross-section and defining two conduits through the inverter means, the conduits being movable between first and second positions, said first position connecting the first exit orifice to the first flow path for conveying the first material to the core of the elongated element and connecting the second orifice to the second flow path for conveying the second material to the outer sheath of the elongated element, and said second position connecting the first exit orifice to the second flow path for conveying the first material to the outer sheath of the elongated element and connecting the second exit orifice to the first flow path for conveying the first material to the core of the elongated element.*

*24. A device for extruding a continuous elongated element of plastic materials having a core encompassed by at least one outer sheath, comprising:*

*a main extruder for extruding a continuous main flow of a plastic material;*

*first auxiliary feed means for feeding a first continuous auxiliary flow of a first material, the first auxiliary feed means having a first exit orifice for continuously conducting said first auxiliary flow;*

*second auxiliary feed means for feeding a second continuous auxiliary flow of a second exit orifice for continuously conducting said second auxiliary flow;*

*extruder means for extruding the elongated element comprised of said main flow and said first and second auxiliary flows, the extruder means having a first flow path for directing one material of said first and second materials to join with the main flow to form the core of the elongated element and a second flow path for directing the other material of said first and second materials to form the outer sheath of the elongated element to encompass the core; and*

*inverter means connected to the first and second exit orifices of the first and second auxiliary feed means and the first and second flow paths of the extruder means, for selectively exchanging connections between the first and second exit orifices and the first and second flow paths to selectively exchange relative positions in the elongated element of the first and second materials, the inverter means being circular in cross-section and defining two conduits through the inverter means, at least one conduit extending about a periphery of the circular cross-section to extend partially circumferentially about the circular cross-section.*

*25. A device for extruding a continuous elongated element of plastic materials, comprising:*

*a main extruder for extruding a continuous main flow of a plastic material;*

*first auxiliary feed means for feeding a first continuous auxiliary flow of a first material, the first auxiliary feed means having a first exit orifice for continuously conducting said first auxiliary flow;*

*second auxiliary feed means for feeding a second continuous auxiliary flow of a second material, the second auxiliary feed means having a second exit orifice for continuously conducting said second auxiliary flow;*

*extruder means for extruding the elongated element comprised of said main flow and said first and second auxiliary flows, the extruder means having a first flow path for burying one material of said first and second materials within the main flow and a second flow path for directing the other material of said first and second materials to from an overcoat for the elongated element, the overcoat encompassing the main flow and the one material; and*

*inverter means connected to the first and second exit orifices of the first and second feed means and the first and second flow paths of the extruder means, for selectively exchanging connections between the first and second exit orifices and the first and second flow paths so that the material that was previously the overcoat can be buried within the elongated element and the material that was previously buried within the elongated element can be the overcoat.*

*26. A device for extruding a continuous elongated element of plastic materials, comprising:*

*a main extruder for extruding a continuous main flow of a plastic material;*

*first auxiliary feed means for feeding a first continuous auxiliary flow of a first material, the first auxiliary feed means having a first exit orifice for continuously conducting said first auxiliary flow;*

*second auxiliary feed means for feeding a second continuous auxiliary flow of a second material, the second auxiliary feed means having a second exit orifice for continuously conducting said second auxiliary flow;*

*extruder means for extruding the elongated element comprised of said main flow and said first and second auxiliary flows, the extruder means having a first flow path for burying one material of said first and second materials within the main flow and a second flow path for directing the other material of said first and second materials to form an overcoat for the elongated*

*element, the overcoat encompassing the main flow and the one material; and*

*inverter means connected to the first and second exit orifices of the first and second feed means and the first and second flow paths of the extruder means, for selectively exchanging connections between the first and second exit orifices and the first and second flow paths, the inverter means being circular in cross-section and defining two conduits through the inverter means, the conduits being movable between first and second positions, said first position connecting the first exit orifice to the first flow path for burying the first material within the elongated element and connecting the second exit orifice to the second flow path for conveying the second material to be the overcoat of the elongated element, and said second position connecting the first exit orifice to the second flow path for conveying the first material to be the overcoat of the elongated element and connecting the second exit orifice to the first flow path for burying the second material in the elongated element, so that the material that was previously the overcoat can be buried within the elongated element and the material that was previously buried within the elongated element can be the overcoat.*

* * * * *